United States Patent
Choo

(10) Patent No.: US 7,815,380 B2
(45) Date of Patent: Oct. 19, 2010

(54) METHOD AND APPARATUS FOR CREATING NEW FOLDER IN BUILT-IN STORAGE OF IMAGE FORMING APPARATUS, AND METHOD AND APPARATUS FOR STORING DATA USING THE SAME

(75) Inventor: Young-ok Choo, Icheon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1010 days.

(21) Appl. No.: 11/435,877

(22) Filed: May 18, 2006

(65) Prior Publication Data
US 2006/0263083 A1 Nov. 23, 2006

(30) Foreign Application Priority Data
May 21, 2005 (KR) .................. 10-2005-0042774

(51) Int. Cl.
*G03B 17/00* (2006.01)
(52) U.S. Cl. .................. 396/439; 358/1.15; 358/403
(58) Field of Classification Search .................. 396/439; 707/104.1, 205; 358/1.15, 1.13, 1.16, 403
See application file for complete search history.

(56) References Cited

U.S. PATENT DOCUMENTS

| 6,822,753 | B1 * | 11/2004 | Momose ................... 358/1.13 |
| 6,856,414 | B1 * | 2/2005 | Haneda et al. ............. 358/1.15 |
| 7,098,947 | B2 * | 8/2006 | Iwauchi .................... 348/231.1 |
| 7,428,068 | B2 * | 9/2008 | Kadoi et al. ............... 358/1.15 |
| 2005/0010610 | A1 | 1/2005 | Nishimura |
| 2005/0107689 | A1 * | 5/2005 | Sasano ...................... 600/425 |
| 2005/0141015 | A1 * | 6/2005 | Fusayuki ................... 358/1.14 |
| 2005/0161510 | A1 * | 7/2005 | Kiiskinen ................. 235/472.01 |
| 2005/0237396 | A1 * | 10/2005 | Hagiwara et al. ......... 348/231.99 |
| 2006/0098105 | A1 * | 5/2006 | Okisu et al. ............. 348/231.99 |

FOREIGN PATENT DOCUMENTS

| JP | 2003-260847 | 9/2003 |
| JP | 2003-319104 | 11/2003 |
| JP | 2005-044345 | 2/2005 |
| KR | 1995-16141 B1 | 6/1995 |

OTHER PUBLICATIONS

Office Action issued in Korean Patent Application No. 2005-42774 on Jul. 24, 2006.

* cited by examiner

*Primary Examiner*—Jay M Patidar
(74) *Attorney, Agent, or Firm*—Staas & Halsey LLP

(57) ABSTRACT

A method and an apparatus for creating a new folder in an image forming apparatus having a built-in storage unit and a method and an apparatus for storing data using the same. The method of creating a folder in an image forming apparatus having a built-in storage unit includes determining whether to create the new folder in the built-in storage unit; and creating the new folder. The method of storing data includes: determining whether to store data from an external source; designating a folder for storing the data through a manipulation unit; and storing the data in the designated folder. When the data from an external storage is stored in a mass storage medium, such as a hard disk drive (HDD), a user is allowed to create, retrieve, and designate a folder for storing the data through a manipulation unit, such as a number key.

17 Claims, 4 Drawing Sheets

METHOD AND APPARATUS FOR CREATING NEW FOLDER IN BUILT-IN STORAGE OF IMAGE FORMING APPARATUS, AND METHOD AND APPARATUS FOR STORING DATA USING THE SAME

CROSS-REFERENCE TO RELATED APPLICATION

This application claims the benefit of Korean Application No. 2005-42774, filed May 21, 2005, in the Korean Intellectual Property Office, the disclosure of which is incorporated herein by reference.

BACKGROUND OF THE INVENTION

1. Field of the Invention

Aspects of the present invention relate to an image forming apparatus, and more particularly, to a method and an apparatus to create a new folder for storing data in a built-in storage medium of an image forming apparatus, and a method and an apparatus to store data in the created folder and retrieve data from the built-in storage unit by using a manipulation unit of the image forming apparatus.

2. Description of the Related Art

Recently, digital devices, such as a digital camera, a digital camcorder, and a camera phone, are increasingly used. At the same time, users' demands for printing image data generated from the digital devices are accordingly increased.

Image forming apparatuses such as a printer and a multi-function peripheral having an internal storage, such as a hard disk drive (HDD), can store image data or other data from conventional copy machines, printers, or facsimiles in the HDD built in the image forming apparatus without being required to carry such data in a separate personal storage device or a document. However, when the data to be printed is stored in the HDD, particularly when the data is directly stored in a storage unit of a printer through an USB card or a memory card without help from a host computer, it is nearly impossible or excessively cumbersome to select a destination in which to store the data. Furthermore, it is inconvenient to retrieve a desired piece of data from such an HDD.

Typically, in order to store external data in the HDD of the printer without help of a host computer, an USB port or a memory slot is utilized. Most such input channels are set to store the data in a specific folder designated by the printer. In addition, more complex processes are necessary to create a new folder and store the data in it. Thus, most users direct the host computer to interact with the HDD of the printer to transfer the data stored in the HDD of the printer to a different folder. Otherwise, the data to be stored is initially stored in the host computer and transferred to a desired folder of the HDD of the printer.

Recently, approaches for connecting an external storage to a printer and directly printing the data stored in the external storage without help of a personal computer are preferred as in PictBridge. In these approaches, it is also difficult for a user to store the data in a desired location (e.g. a desired folder). Also, it is not easy to interact with a host computer to store the data in the desired location whenever the data is to be stored. Furthermore, these approaches are not preferable for effective utilization of the HDD, of which capacity is regularly increased from gigabytes to terabytes at the present time.

Therefore, if a user is allowed to create, register, and designate a folder in the built-in storage unit of the image forming apparatus by using an input key of the image forming apparatus, for example, a number key of a multi-function peripheral or a printer, it would be convenient to store the data in a desired location. In addition, the storage unit, for example, a hard disk drive (HDD), of the image forming apparatus would be more effectively utilized.

SUMMARY OF THE INVENTION

Aspects of the present invention provide a method and an apparatus for creating a folder in an image forming apparatus having a built-in storage medium, such as a hard disk drive by using a manipulation unit of the image forming apparatus.

Also, aspects of the present invention provide a method and an apparatus for storing data in a desired folder location of an image forming apparatus having a built-in storage unit by using a manipulation unit of the image forming apparatus.

According to an aspect of the present invention, there is provided a method of creating a folder in an image forming apparatus having a built-in storage unit, comprising: determining whether or not a folder is to be created for storing data from an external storage unit in the built-in storage unit of the image forming apparatus; and creating a new folder in the built-in storage unit when it is determined that the new folder is to be created.

According to another aspect of the present invention, there is provided an apparatus for creating a folder in an image forming apparatus having a built-in storage unit, comprising: a display unit to display a query for determining whether or not a new folder is to be created for storing data from an external storage unit in the built-in storage unit of the image forming apparatus; and a control unit to create a new folder in the built-in storage unit if it is determined that the new folder is to be created.

According to an aspect of the invention, the image forming apparatus may comprise a manipulation unit to manipulate the image forming apparatus, and at least one of a direction key, a number key, a touch screen, a selection key, and/or an enter key to be used as the manipulation unit.

According to another aspect of the present invention, there is provided a method of storing data in an image forming apparatus having a built-in storage unit, comprising: determining whether or not data from an external storage unit is to be stored in the built-in storage of the image forming apparatus when the external storage unit is connected to the image forming apparatus; designating a folder for storing the data through a manipulation unit of the image forming apparatus when it is determined that the data from the external storage unit is to be stored in the image forming apparatus; and storing the data in the designated folder.

According to an aspect of the invention, the connection between the external storage unit and the image forming apparatus may be made through an USB port or a memory slot.

According to an aspect of the invention, the determining whether or not the data from an external storage unit is to be stored in the built-in storage may further comprise establishing a storing location in the built-in storage unit of the image forming apparatus when it is determined that the data is to be stored in the built-in storage unit of the image forming apparatus.

According to an aspect of the invention, the manipulation unit of the image forming apparatus may comprise at least one of a direction key, a number key, a touch screen, a selection key, and/or an enter key.

The storing the data in the designated folder may comprise: storing the data in the designated folder when it is determined that the folder designated through the manipulation unit of the image forming apparatus exists; and creating a new folder and storing the data in the new folder when it is determined that the folder designated through the manipulation unit does not exist.

According to an aspect of the invention, the built-in storage unit of the image forming apparatus may be a mass storage unit including a hard disk drive.

According to still another aspect of the present invention, there is provided an apparatus for storing data in an image forming apparatus having a built-in storage unit, comprising: a user interface unit for determining whether or not the data is to be stored in the built-in storage unit of the image forming apparatus when an external storage unit is connected to the image forming apparatus; a folder location designation unit to designate a folder location for storing the data through a manipulation unit of the image forming apparatus; and a data processing unit to perform processes for storing the data in the folder when the folder location is designated.

According to an aspect of the invention, the data processing unit may comprise: a folder search unit to determine whether or not the designated folder exists; and a storage control unit to store the data in the designated folder when it is determined that the designated folder exists, or create a new folder for storing the data when it is determined that the designated folder does not exist.

According to still another aspect of the present invention, there is provided a computer-readable recording medium storing a program for executing aspects of the invention described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
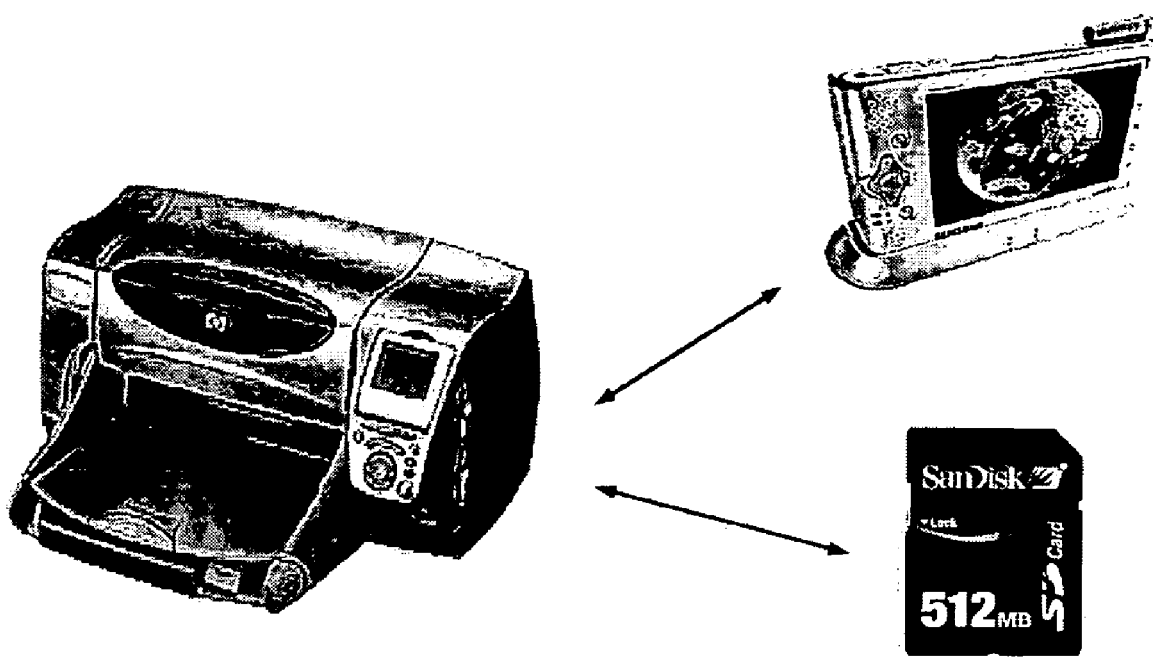
FIG. 1 is a schematic diagram illustrating a multi-function peripheral, a portable memory card as an example of an external storage unit, and a digital camera for applying aspects of the present invention thereto.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a multi-function peripheral image forming apparatus, a portable memory card (i.e., an external storage), and a digital camera for applying aspects of the present invention. However, it is understood that other storage devices can be used, such as cell phones and portable data reproducing devices such as an IPOD. Moreover, connections can be using wired/wireless networks in addition to using memory reading drives and or cables as shown.

Figure 2:
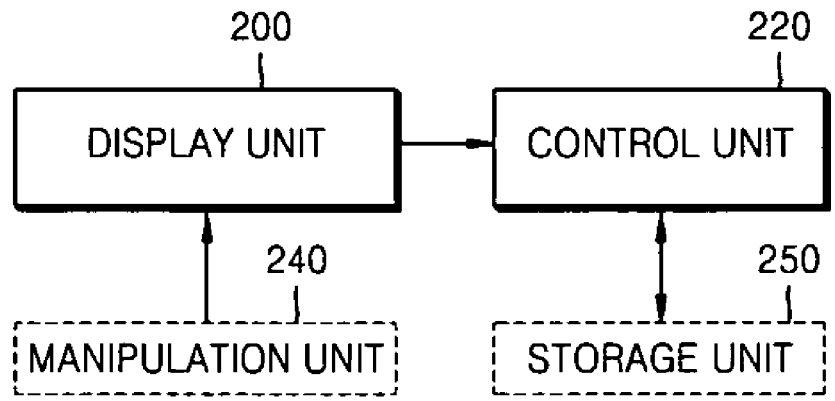
FIG. 2 is a block diagram illustrating a configuration of a folder creating apparatus of an image forming apparatus having a built-in storage unit, according to an embodiment of the present invention.

FIG. 2 is a block diagram illustrating a configuration of a folder creating apparatus of an image forming apparatus having a built-in storage, according to an embodiment of the present invention, which includes a display unit 200 and a control unit 220. On the display unit 200, a query for determining whether or not a folder is to be created for storing data from the external storage in a built-in storage of the image forming apparatus is displayed. Although the current embodiment describes the display unit 200 as part of the image forming apparatus, it is understood that the present invention is not limited thereto, that is, the display unit 200 can be an external display such as a flat panel display monitor.

The control unit 220 creates a folder in the built-in storage unit 250 when a user determines to create a new folder in the built-in storage unit 250 of the image forming apparatus through the query displayed on the display unit 200. The image forming apparatus has a manipulation unit 240 required for manipulation, and the manipulation unit 240 uses at least one of a direction key, a number key, a touch screen, a selection key, and an enter key. For example, it is possible to create a folder by selecting creation of a new folder through a number key of the image forming apparatus and designating a name of the folder through the number key when the query for determining whether or not a new folder is to be created is displayed on the display unit 200. Although described as part of the image forming apparatus, it is understood that, similar to the display unit 200, the manipulation unit 240 can be external to the image forming apparatus and that the manipulator unit 240 can be integrated into the display unit 200 as in a touch screen display. Moreover, it is understood that other mechanisms can be used to input and/or name folders in addition to or instead of the described keys.

Figure 3:
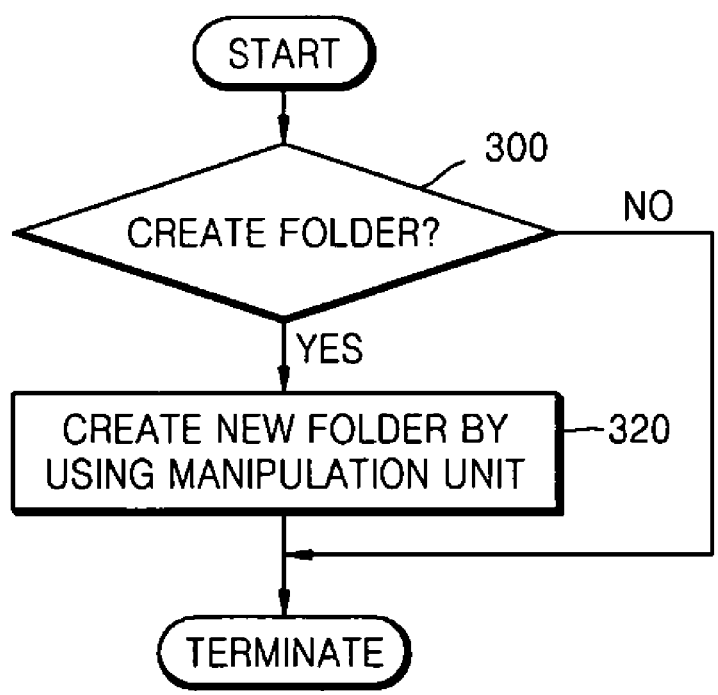
FIG. 3 is a flowchart illustrating a method of creating a folder in an image forming apparatus having a built-in storage unit, according to an embodiment of the present invention.

FIG. 3 is a flowchart illustrating a method of creating a new folder in an image forming apparatus having a built-in storage unit, according to an embodiment of the present invention. Now, operations in a method of and an apparatus for creating a folder in an image forming apparatus will be described with reference to FIG. 3. First, when a folder creation query is displayed on the display unit 200, a user determines whether or not a new folder is to be created for storing the data from the external storage unit in the built-in storage unit of the image forming apparatus (operation 300). When the user determines to create a new folder, the folder is created in the built-in storage unit (operation 320). In this case, the user can create a new folder in the storage unit 250 by selecting creation of a new folder through a manipulation unit, such as a number key, of the image forming apparatus and designating the name of the folder through the number key.

Figure 4:
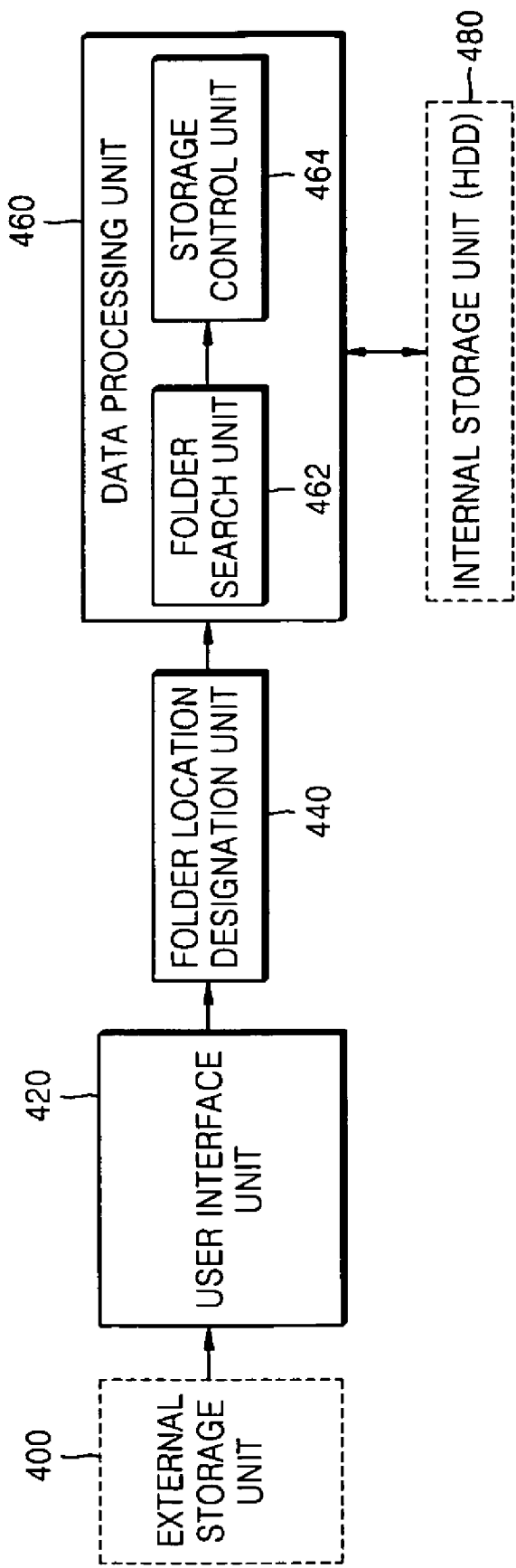
FIG. 4 is a block diagram illustrating a configuration of a data storage unit of an image forming apparatus having a built-in storage unit, according to an embodiment of the present invention.

FIG. 4 is a block diagram illustrating a configuration of a data storage unit of an image forming apparatus having a built-in storage unit, according to an embodiment of the present invention. The data storage unit of the image forming apparatus includes a user interface unit 420, a folder location designation unit 440, and a data processing unit 460.

When an external storage unit 400 is connected to the image forming apparatus, the user interface unit 420 from inquiries the built-in storage unit 480 of the image forming apparatus about where the data from the external storage unit 400 is to be stored. The connection between the external storage unit 400 and the image forming apparatus can be made by using an USB port, a memory slot, and/or wired or wireless connections. The shown image forming apparatus can perform a function of an USB host. In addition, the external storage unit 400 may be any of all digital data storage media including a memory stick, a memory of a digital camera, and a memory of a mobile phone if it is external to the image forming apparatus. The image forming apparatus may be a printer, or a multi-function peripheral, or the like. Typically, the built-in storage unit 280 of the image forming apparatus may be a mass storage medium, such as a hard disk drive (HDD). The aforementioned hard disk drive may initially have folders or not depending on application environments. However, it is understood that other magnetic and/or optical drives can be used.

The folder location designation unit 440 accepts a folder location from a user through a manipulation unit. For example, a number key including 0, 1, 2, . . . A, B, C, . . . , of the image forming apparatus such as a multi-function peripheral can input the folder location. The folder location is a location where the data are to be stored. While not required in all aspects, the manipulation unit 240 has at least one of a direction key, a number key, a touch screen, a remote controller, a selection key, an enter key, or combinations thereof. The number key may be used to designate Arabic numerals or English alphabetic characters depending on an operation mode.

When the folder location for storing the data is designated by the user through the keys of the image forming apparatus, the data processing unit 460 stores the data in the designated folder. The data processing unit 460 preferably includes a folder search unit 462 and a storage control unit 464.

The folder search unit 462 examines whether or not the folder designated by the number key of the image forming apparatus exists. When the designated folder exists, the storage control unit 464 stores the data in the designated folder. Otherwise, a new folder is created to store the data.

Figure 5:
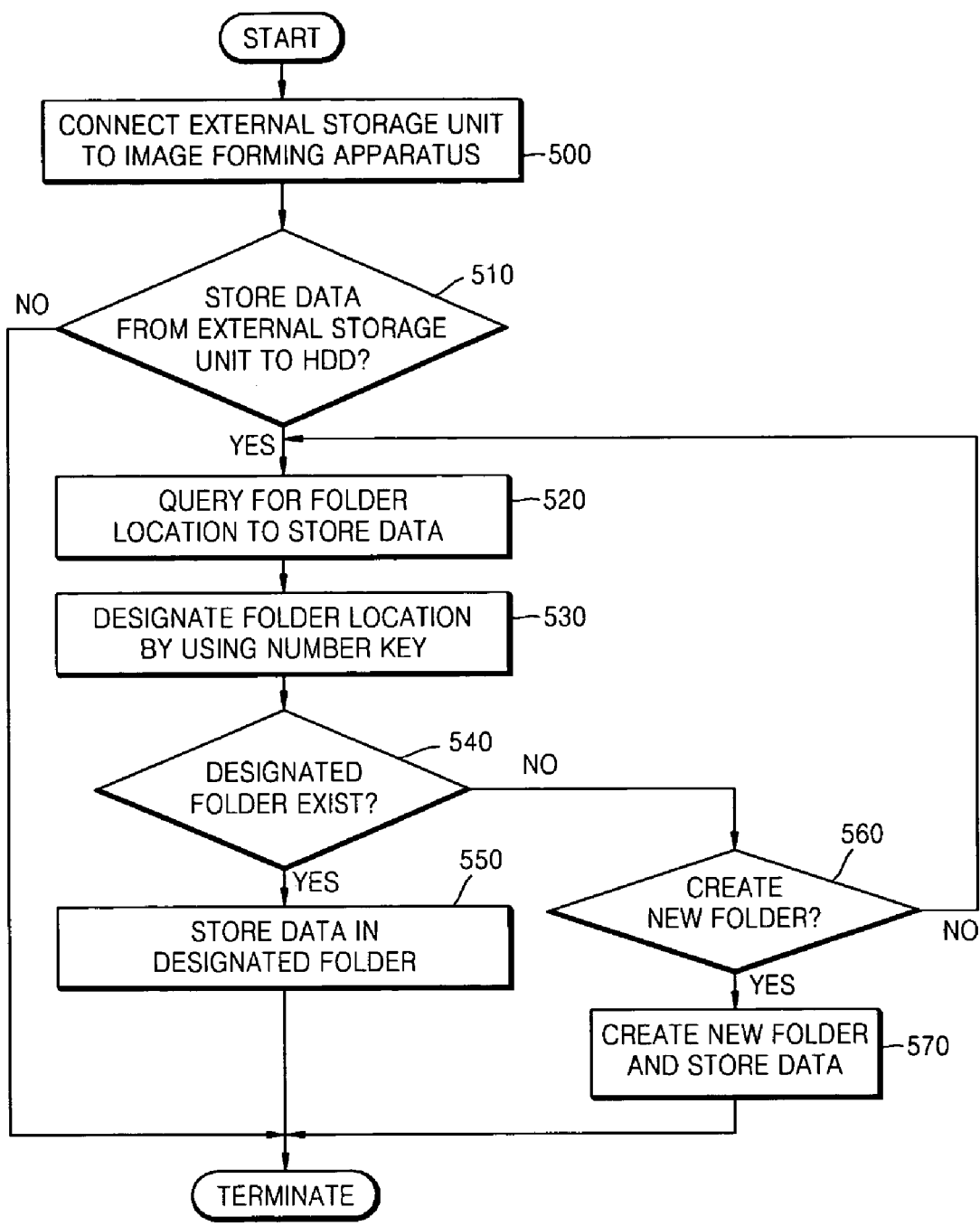
FIG. 5 is a flowchart illustrating a method of storing data in an image forming apparatus having a built-in storage unit, according to an embodiment of the present invention.

FIG. 5 is a flowchart illustrating an exemplary method of storing data in a built-in storage unit of an image forming apparatus, according to an embodiment of the present invention. Now, operations in a method and an apparatus for storing data in a built-in storage unit of an image forming apparatus according to the present invention will be described with reference to FIG. 5.

The basic concept of a method of and an apparatus for storing data in a built-in storage unit of an image forming apparatus according to the present embodiment is to store the data from an external storage unit in a location (a folder) designated by a user through a manipulation unit such as a number key, for example, when the external data is stored in a printer having a storage unit, e.g., an HDD, through an USB port or a memory slot without help of a host computer.

First, the external storage unit 400 is connected to an image forming apparatus, e.g., a printer, having a built-in storage unit 480 (e.g., an HDD) through an USB port or a memory slot (operation 500). Then, it is determined whether or not the data from the external storage unit 400 is to be stored in the HDD 480 of the printer (operation 510). When it is determined that the data from the external storage unit 400 is to be stored in the HDD of the printer, a folder location for storing the data in the HDD of the printer is inquired (operation 520). Then, a user designates a folder for storing the data by using a manipulation unit 240, such as a number key 0 through 9 of the printer. The name of the folder may be, for example, 1, 2, 3, . . . , A, ABC, and the like.

When the name of the folder is designated, a user examines whether or not the folder designated by using the number key exists in the storage unit through the folder search unit 462 (operation 540). As a result of the examination, when it is determined that the designated folder exists in the HDD 480, the data from the external storage unit 400 is stored in the designated folder (operation 550). When the folder designated by the number key does not exist in the HDD 480, whether or not a new folder is to be created is inquired (operation 560). When it is determined that a new folder is to be created, the new folder is created and the data is stored in it (operation 570). Otherwise, when it is determined that a new folder is not to be created, another folder location for storing the in the HDD 480 of the printer is inquired again (operation 520).

While not required, it is understood that aspects of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM). CD-ROMs, magnetic tapes, floppy disks, and optical data storage devices.

According to aspects of the present invention, it is possible to improve user's convenience (in creating a new folder, and storing and retrieving the data) and increase utilization of the data stored in a mass storage medium such as a built-in hard disk drive of an image forming apparatus by allowing a user to create, retrieve, and designate a folder for storing the data through a manipulation unit such as a number key when the data from an external storage unit is stored in the hard disk drive of a printer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of creating a folder from an image forming apparatus capable of forming an image connected with a host apparatus and having a storage unit, comprising:

determining whether a folder is to be created for storing data from an external storage unit in the storage unit of the image forming apparatus without using the host apparatus; and creating a new folder in the storage unit without using the host apparatus when it is determined that a new folder is to be created, wherein the image forming apparatus is a printer, a copy machine or a fax machine and comprises a manipulation unit to receive user inputs for manipulating the image forming apparatus to designate a folder to store the data from the external storage unit, and wherein the manipulation unit uses at least one of a direction key, a number key, a touch screen, a selection key, and an enter key.

2. The method according to claim 1, wherein the determining whether the folder is to be created further comprises:

displaying a query to a user on a display unit to name a new folder; and receiving an answer through the manipulation unit with a name for the new folder.

3. A method of storing data in an image forming apparatus capable of forming an image connected with a host apparatus and having a storage unit, comprising:

determining whether or not data from an external storage unit is to be stored in the storage unit of the image forming apparatus without using the host apparatus when the external storage unit is connected to the image forming apparatus;

designating a folder for storing the data through a manipulation unit of the image forming apparatus without using the host apparatus when it is determined that the data from the external storage unit is to be stored in the image forming apparatus; and storing the data in the designated folder, wherein the manipulation unit of the image forming apparatus comprises at least one of a direction key, a number key, a touch screen, a selection key, and an enter key or combinations thereof, and wherein the image forming apparatus is a printer, a copy machine or a fax machine.

4. The method according to claim 3, wherein a connection between the external storage unit and the image forming apparatus is made through an USB port or a memory slot.

5. The method according to claim 3, wherein the determining whether or not the data from an external storage unit is to be stored in the storage unit further comprises establishing a storing location in the storage unit of the image forming apparatus when it is determined that the data is to be stored in the storage unit of the image forming apparatus.

6. The method according to claim 3, wherein the storing the data in the designated folder comprises:

storing the data in the designated folder when it is determined that the folder designated through the manipulation unit of the image forming apparatus exists; and creating a new folder and storing the data in the new folder when it is determined that the folder designated through the manipulation unit does not exist.

7. The method according to claim 3, wherein the storage unit of the image forming apparatus is a mass storage unit including a hard disk drive.

8. The method according to claim 3, wherein the determining whether data from the external storage unit is to be stored further comprises:

displaying a query to a user on a display unit whether to store the data; and receiving an answer through the manipulation unit whether to store the data.

9. The method according to claim 3, wherein the designating the folder for storing the data further comprises:

displaying a query to a user on a display unit to designate the folder; and receiving an answer through the manipulation unit with a name of the designated folder to store data in.

10. The method according to claim 3, further comprising the image forming apparatus printing the stored data.

11. An apparatus to create a folder in an image forming apparatus capable of forming an image connected with a host apparatus and having a storage unit, comprising:

a display unit to display a query for determining whether or not a new folder is to be created for storing data from an external storage unit in the storage unit of the image forming apparatus without using the host apparatus; and a control unit to create a new folder in the storage unit without using the host apparatus when it is determined that a new folder is to be created, wherein the image forming apparatus is a printer, a copy machine or a fax machine and comprises a manipulation unit to manipulate the image forming apparatus to designate a folder to store the data from the external storage unit, and wherein the manipulation unit uses at least one of a direction key, a number key, a touch screen, a selection key, and an enter key.

12. The apparatus according to claim 11, wherein the image forming apparatus stores the data in the new folder, and prints the stored data.

13. An apparatus to store data in an image forming apparatus capable of forming an image connected with a host apparatus and having a storage unit, comprising:

a user interface unit to determine whether the data is to be stored in the storage unit of the image forming apparatus without using the host apparatus when an external storage unit is connected to the image forming apparatus;

a folder location designation unit to designate a folder location for storing the data according to input from a manipulation unit of the image forming apparatus without using the host apparatus, the image forming apparatus being a printer, a copy machine or a fax machine; and a data processing unit to perform processes for storing the data in a folder at the designated folder location, wherein a connection between the external storage unit and the image forming apparatus is made using an USB port or a memory slot.

14. The apparatus according to claim 13, wherein the data processing unit comprises:

a folder search unit to determine whether the designated folder exists; and a storage control unit to store the data in the designated folder when it is determined that the designated folder exists, or to create a new folder for storing the data when it is determined that the designated folder does not exist.

15. The apparatus according to claim 13, wherein the storage unit of the image forming apparatus is a mass storage medium including a hard disk drive.

16. The apparatus according to claim 13, wherein the image forming apparatus prints the stored data.

17. A method of creating a folder from an image forming apparatus having a storage unit, comprising:

determining whether a folder is to be created for storing data from an external storage unit in the storage unit of the image forming apparatus;

creating a new folder in the storage unit when it is determined that a new folder is to be created;

storing the data in the new folder; and printing, by the image forming apparatus, the stored data, wherein the image forming apparatus is a printer, a copy machine or a fax machine and comprises a manipulation unit to receive user inputs for manipulating the image forming apparatus, and wherein the manipulation unit uses at least one of a direction key, a number key, a touch screen, a selection key, and an enter key.

* * * * *